United States Patent [19]

Neukomm

[11] 4,352,615
[45] Oct. 5, 1982

[54] FEEDER FOR AUTOMATIC LATHE

[75] Inventor: Walter Neukomm, Court, Switzerland

[73] Assignee: LNS SA, Orvin, Switzerland

[21] Appl. No.: 254,014

[22] Filed: Apr. 13, 1981

Related U.S. Application Data

[63] Continuation of Ser. No. 39,549, May 16, 1979, abandoned.

[30] Foreign Application Priority Data

May 19, 1978 [CH] Switzerland .......................... 5485/78

[51] Int. Cl.³ .......................... B23B 13/00; B23B 15/00
[52] U.S. Cl. ......................................... 414/17; 82/2.7; 414/14
[58] Field of Search ....................... 414/14, 15, 17, 18; 82/2.5, 2.7; 29/37 R

[56] References Cited

U.S. PATENT DOCUMENTS 3,360,139 12/1967 Bechler .................................. 414/15
3,874,520 4/1975 Scheler .................................. 414/18
3,945,506 3/1976 Scheurer ................................ 414/15
4,019,411 4/1977 Bohn et al. ....................... 414/14 X

FOREIGN PATENT DOCUMENTS 1056611 1/1967 United Kingdom .

Primary Examiner—Jeffrey V. Nase
Attorney, Agent, or Firm—Ladas & Parry

[57] ABSTRACT

Feeder for automatic lathe, with a tube wherein the material to be machined is held by a plunger cum piston which can be moved hydraulically within the tube. The invention provides a hydraulic system connectable to the rear opening of the tube for exerting on the piston of the plunger a force directed towards the cutting tools, and also a cable or like flexible member, fixed to the rear of the plunger cum piston, which cable serves both to determine the exact position of the plunger and to pull it backwards for extracting the remaining stub when the bar has been fully machined. The cable is maintained under tension.

14 Claims, 4 Drawing Figures

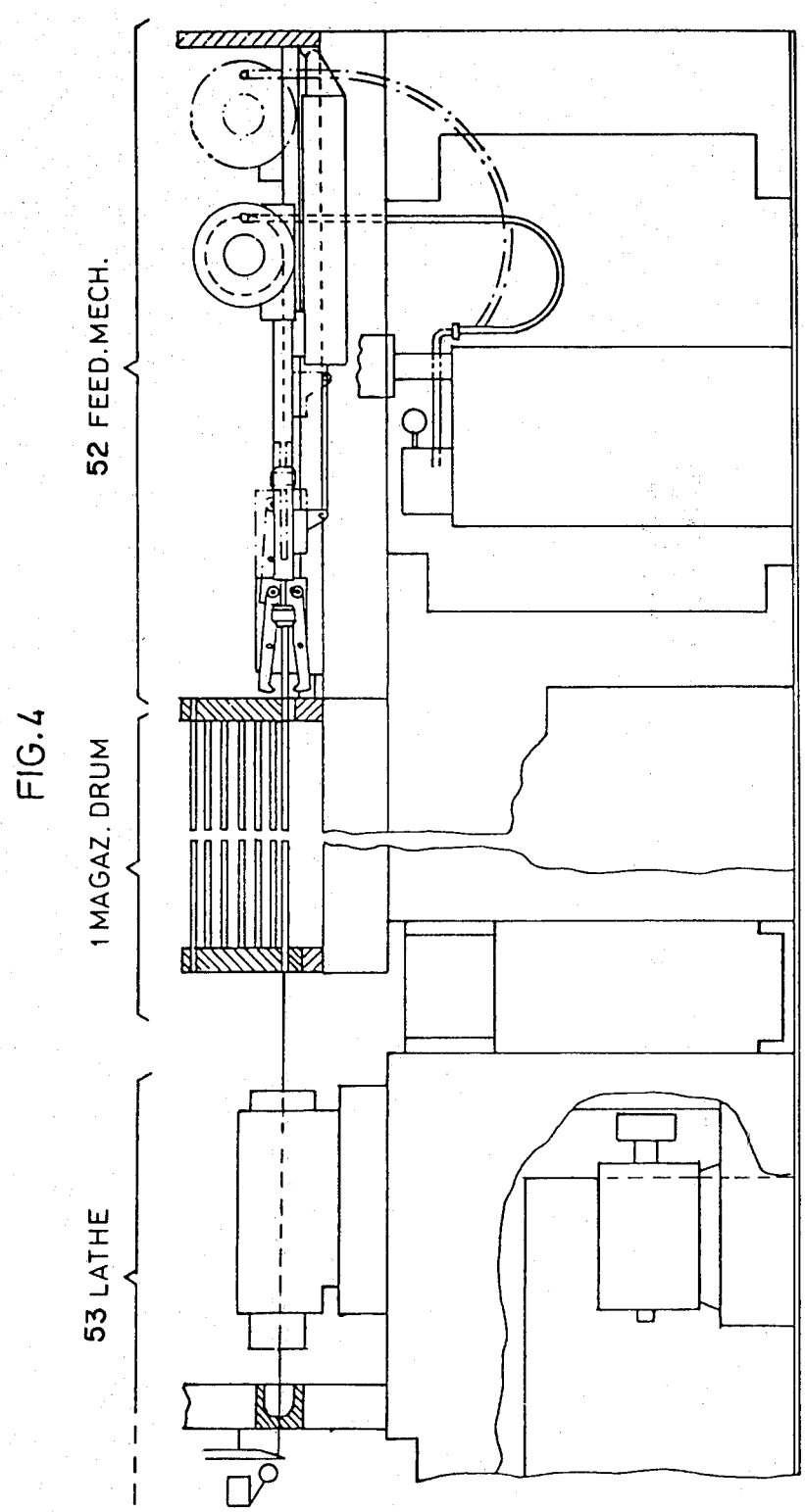

FEEDER FOR AUTOMATIC LATHE

CROSS-REFERENCE TO RELATED APPLICATION

This is a continuation of co-pending application Ser. No. 39,549 filed May 16, 1979, now abandoned.

BACKGROUND OF THE INVENTION

The invention is concerned with a feeder for an automatic lathe, with a tube containing and supporting the bar to be machined during the machining operations, and with a hydraulically urged piston within that tube for moving the bar forward stepwise between operations and extracting the remaining bar stub from the chuck of the lathe after the last operation.

DESCRIPTION OF THE PRIOR ART

These exists a wide variety of feeding devices which supply bars of material to an automatic lathe machining such bars, usually into several identical workpieces. Typically such feeders comprise at least a tube located rearwards of the headstock and aligned with its chuck, where the bar revolves inside the tube—and is supported by it—when its forward end is being machined. Generally a plunger is provided, which is movable longitudinally in the tube and serves to push the bar forward whenever the machining of a new workpiece is to begin. The plunger generally has a pretensioned, elastically gripping collet which grips the rear end of the bar and is able to pull the stub which is left over after full machining of the bar out of the chuck and sometimes as far as the rear end of the tube, once this stub has become too short for further machining. Originally the plunger comprised a lateral tab protruding out of the tube, which had a lengthwise slit to that effect, and the plunger was moved by mechanically acting on the tab. Nowadays one often maintains a certain amount of oil in the tube, in order to reduce the noise due to the fast rotation in the tube of a bar which sometimes even has an asymmetric cross-section. This oil also reduces the wear of the bar and dampens its vibrations. The surplus oil exits at the front end of the tube, which is not hermetically closed. Sometimes the oil flows in through the rear end of the tube and is simultaneously used to push a plunger which then comprises a piston-like part loosely fitted into the tube. The oil pressure at the rear of this piston pushes it forward, whilst the clearance between tube and piston allows a sufficient quantity of oil to flow forward for efficiently surrounding the rotating bar. Although this arrangement allows to exert by way of the plunger a sufficient pressure on the bar to move it forward, it does not permit to move the bar forward by a precisely determined amount, and in general also does not allow to pull the stub, which is all that remains of the bar after it has been fully machined, out of the chuck because the force exerted by applying a vacuum at the rear of the plunger is too weak. This consequently requires provision of separate mechanical means, located between headstock and feeder and which must hence be retractable, in order to pull out the stub and ejecting the same. This severely complicates the outlay of the feeder, without solving the problem of an exactly metered advance of the bar between two machining operations.

SUMMARY OF THE INVENTION

It is an aim of the invention to allow at any moment—and in particular before the machining of a new bar begins—a precise location of the latter. The invention also aims at allowing to urge the bar, or its remnant, backward with a force considerably superior to the suction obtainable by a vacuum-operated plunger. At the same time the advantages of a hydrodynamical forward thrust of the plunger shall be retained, together with the possibility to allow a controlled leakage of oil toward the front part of the tube in order to maintain a dampening oil sheet around the bar.

Furthermore, the invention permits an extremely accurate positioning of the bar with respect to the cutting tools. To this end, the feeder of the invention is characterized by: a plunger comprising a piston and movable in a feeder tube; a hydraulic system connectable to the rear part of the tube in order to push the plunger forward; and a flexible connecting means attached at the rear of the plunger and tensioned by a pretensioning means which exerts a pull on it.

BRIEF DESCRIPTION OF THE DRAWINGS

The invention will now be illustrated in more detail by describing an embodiment of the same at hand of the drawing wherein:

FIG. 4 is a schematic side elevation, partly cut away, of a lathe equipped with feed apparatus in accordance with the invention.

DETAILED DESCRIPTION OF THE PREFERRED EMBODIMENT

Figure 1:
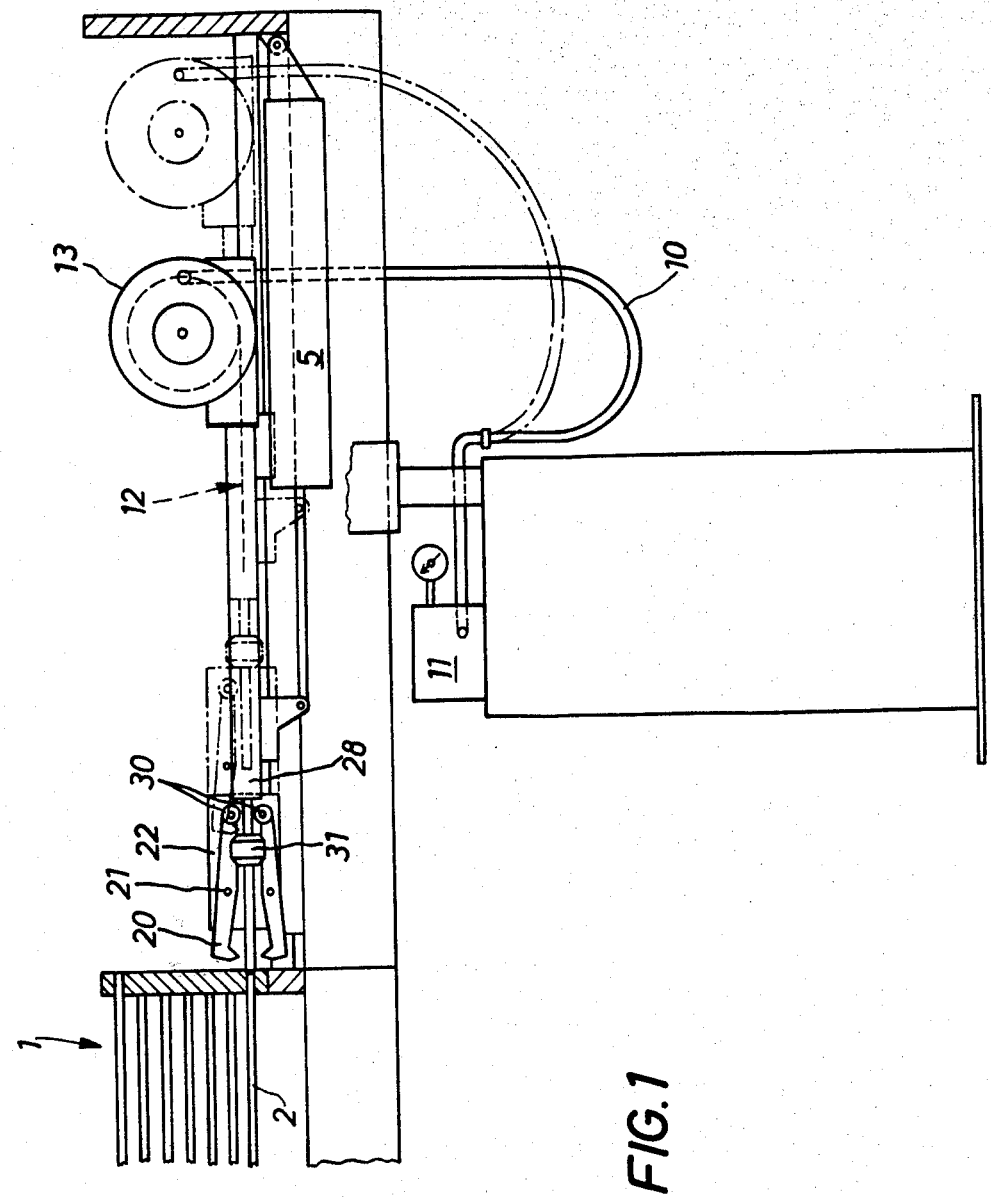
FIG. 1 shows a schematic general view of the embodiment.

FIG. 4 schematically shows a general view of an automatic lathe equipped with a feeder for bar stock. The feeder, which comprises a magazine drum 1 (see FIG. 1 also) and a feed mechanism 52, feeds an automatic lathe 53 which is located at the left of the feeder as shown in FIG. 4, which side will hereafter be called the front or forward side of the apparatus, the rear of which is located on the right-hand side. The bars of the material to be machined are stored in the tubes 2 of the magazine drum 1. An indexing operation induces a stepwise rotation of the drum and thereby brings a new, loaded tube into alignment with the axis of the chuck of the lathe after the preceding bar has been entirely machined. As a result of a previous operation (which will be described in more detail below) this new bar protrudes by a predetermined amount at the rear of the tube and can therefore be clamped and immobilized by a vice 20 (FIG. 1) in order to be pushed into the collet of the plunger. The jaws of the vice are rocking on axles 21 fixed on a carriage 22 which can freely glide on rectified guide bars made of hardened steel, and thus move along a rectilinear path parallel to the axis of the tube and bounded at each end by a stop-dog. The plunger, which carries at its forward end a collet of known design and of a shape adapted to the section of the bar, is then locked in a movable housing 28 which is connected to a cam 31 belonging to the vice and which at this moment is located as indicated by chained lines. A linear motor 5 then moves housing and plunger (the latter being invisible in FIG. 1) forward. When the cam 31 meets the followers 30 which are arranged to actuate the closing of the jaws of the vice (which is then also located as indicated by chained lines), then the action of biasing springs (not shown) which maintain the jaws open keeps the followers from separating further. Thus the cam 31 pushes the open vice together with its carriage 22 as far as the location indicated by full lines where the carriage is stopped by a stop-dog (also invisible in FIG. 1). The linear motor 5 continues to push housing and cam, so that the latter squeezes itself between the followers 30, thereby closing the vice, the jaws of which grip the bar near the tube, i.e. at the rear end of the bar which protrudes from the tube. The housing continues to advance and the collet of the plunger is thus forcibly pushed onto the bar until, when the cam emerges on the forward side of the space between the followers 30, these are urged by the biasing springs to move towards each other, thus opening the jaws of the vice. The bar is then freed and thereafter bar, plunger and housing will move forward together, until the housing establishes a fairly oil-tight contact with the rearward opening of the tube. At this moment a separate operation releases the lock which immobilizes the plunger in the housing, and the plunger can then be pushed forward into the tube—which usually is done stepwise—as far and as often as required for fully machining the bar. To this end the plunger is advanced hydraulically, the pressurized oil being delivered to the rear of the housing by a device 11, through a flexible tubing 10 and in a quantity sufficient to ensure that nearly the whole length of the bar is bathed in oil. In order to hydrodynamically support the bar, at least in part, a calibrated oil leakage towards the front side of the plunger is provided, which leakage reduces both the noise and the wear and tear of the bar due to its swift rotation in the tube. A precisely metered advance of the bar is obtained by the use of a cable 12 fixed by a swivel to the rear of the plunger, which cable exits at the rear of the housing through a gland. This cable 12 is wound around a drum 13, which biased by a certain torque in order to exert a slight pull which maintains the cable stretched in alignment with the tube. From the rotational position of the drum, the position of the plunger can be determined at any time and with great accuracy; its stepwise advance, when urged forward by the oil pressure, can thus be regulated with reference to the rotational position of the drum, and it becomes possible accurately to locate the front end of a new bar with respect to the tools in the lathe, thereby avoiding any unnecessary loss of material. For ultimate precision, the portion of the cable between the drum and the plunger should always be exactly aligned with the axis of the chuck. Therefore it is advantageous to provide the outer surface of the drum with a helical groove for receiving that part of the cable which is wound up. Simultaneously, a lead screw or some equivalent device is provided which for each revolution moves the drum parallel to its axis—which itself is perpendicular to that of tube and chuck—by an amount equal to the pitch of said helical groove, in order to maintain the straight part of the cable aligned with the chuck. At the end of the machining process of a bar, when the remaining stub—the length of which depends on that of the finished workpiece—must be extracted from the chuck, the necessary force, which as a rule exceeds what can be obtained by creating a vacuum at the rear of the plunger, is applied by pulling on the cable. The pull is exerted by means of a motor acting directly or indirectly on the drum so that the latter winds up the cable and is greater than the pull applied during forward movement of the plunger in order to maintain the cable stretched in alignment with the tube. When the plunger is thus urged backwards, an oil pressure below the atmospheric pressure is simultaneously maintained at the rear of it in order to aid the backward movement. Preferably, the hydraulic system includes a pressure-sensitive gauge 54 which acts upon the clutch M9 and ensures that during backwards movement of the plunger only the smaller pulling force is exerted on the cable so long as the hydraulic pressure within the system exceeds a given value. Once the plunger is fully retracted into its housing, it is mechanically locked therein before exerting on the housing the force necessary to remove the bar stub from the collet of the plunger. At this moment of the operations, the housing is located in its forward position, both the cam 31 and the vice 20 being approximately in the position indicated by full lines in FIG. 1. Now it is essential than when releasing the vice 20—after the extraction of the stub from the plunger—the stub is already fully withdrawn from the tube 2, even if the stub has its maximum allowed length. This is obtained automatically when moving the housing and the cam backwards by the action of the linear motor 5, because of the unimpeded backward movement of the vice, from the full line position until the vice is stopped by its rearward stop-dog. Indeed, because the followers 30 are maintained near each other by the action of the biasing springs (not represented) which hold the jaws of the vice open, a backward movement of the cam 31 will at first push the followers—and hence the whole vice—to its rearward position, which is chosen so that the stub is then entirely withdrawn from the tube. The vice is then stopped by its rearward dog and is shut by the cam, which still moves backwards thereby forcing the followers 30 apart. Hence the vice immobilizes the stub and a further backward movement of the housing will separate the stub from the plunger. The housing then moves still further and the cam eventually leaves the space between the followers and reaches its original position, as indicated by broken lines.

In consequence the vice opens and liberates the stub, the ejection of which can for security be monitored by an electrical system sensing its passage. The feeder is then ready for a new cycle which will begin by indexing the magazine drum, which operation is itself triggered by the arrival of the housing in its most rearward position. Thus a new, loaded tube is aligned with the axis of the chuck, and a new cycle can begin.

Figure 2:
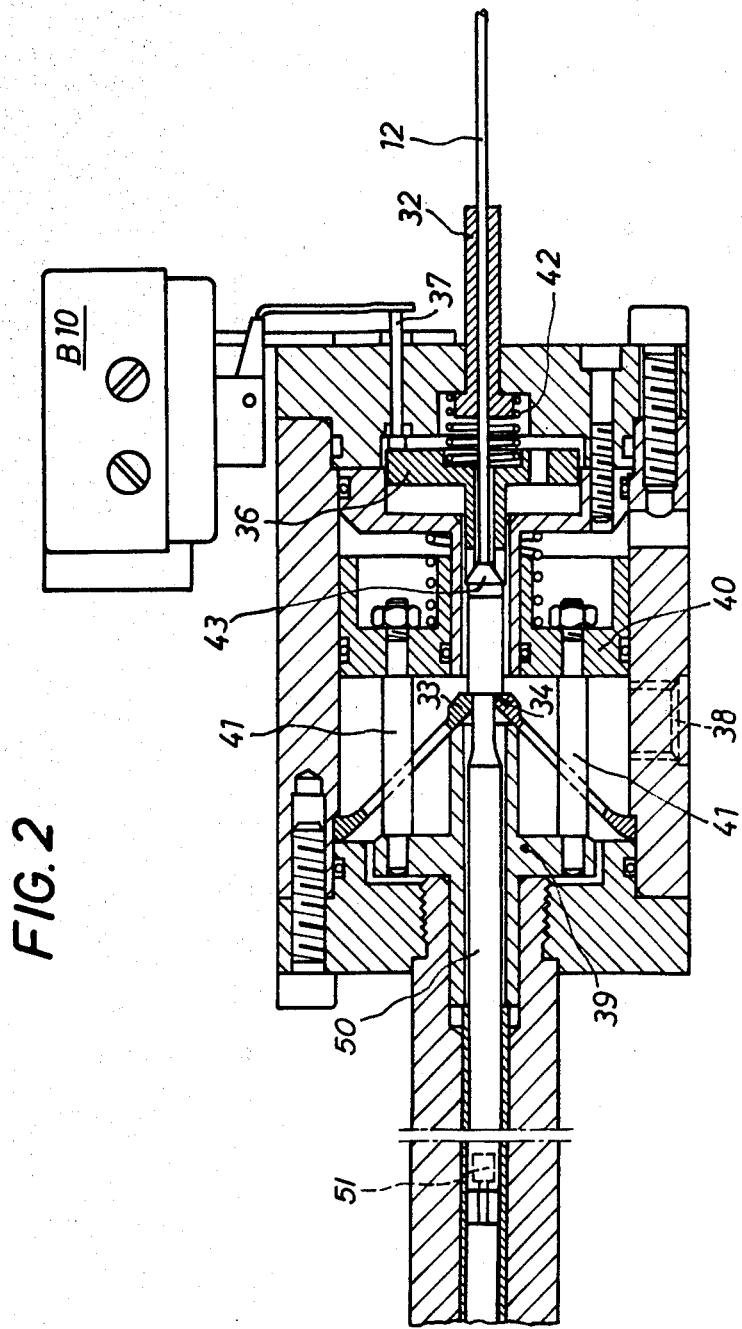
FIG. 2 shows a section of the mechanism for locking the plunger in its housing.

FIG. 2 shows a section of the lock for immobilizing the plunger in its housing, which is mainly used in order to exert on the plunger the sizeable force necessary to separate it from the stub. Reference number 50 indicates the piston, which is attached to a cable 12 by a conical end-piece 43 which facilitates the entering of the piston in the clamp 33. The piston 50 is itself attached to the main body of the plunger (only partially shown, at the extreme left) by a swivel 51. A gland 32 reduces the oil losses at the rear of the apparatus. When the piston 50 arrives (from the forward part of the apparatus, situated on the left in the figures) near its ultimate position with respect to the lock, the resilient clamp 33 engages with a recess 34 provided for it in the piston. A mobile auxiliary piece 39 serves both as a stop for supporting the claws of clamp 33 and avoid their deformation when a great force (towards the left) is applied to the plunger, and also as a wedge means to open said clamp. If, under the combined action of the pull of cable 12 and a vacuum in the hydraulical system, the plunger progresses further towards the right, then it acts on the end switch B10, through a piston 36 and a pin 37. This switch can for instance stop the motor which drives the drum, de-clutch the drum, and let the hydraulic system return to atmospheric pressure. When the latter, which communicates with the interior of the lock housing through an opening 38, is pressurized again, a ring-shaped piston 40 will be pushed towards the right, and take with it the auxiliary piece 39 with which it is connected by way of bolts 41. This opens the clamp 33 which then releases the plunger. The oil pressure also exerts a force directed towards the right onto the piston 36, but the force of the spring 42 is chosen so as to be sufficient to return the piston 36 to the left in spite of the oil pressure, so that the switch B10 will be released.

Figure 3:
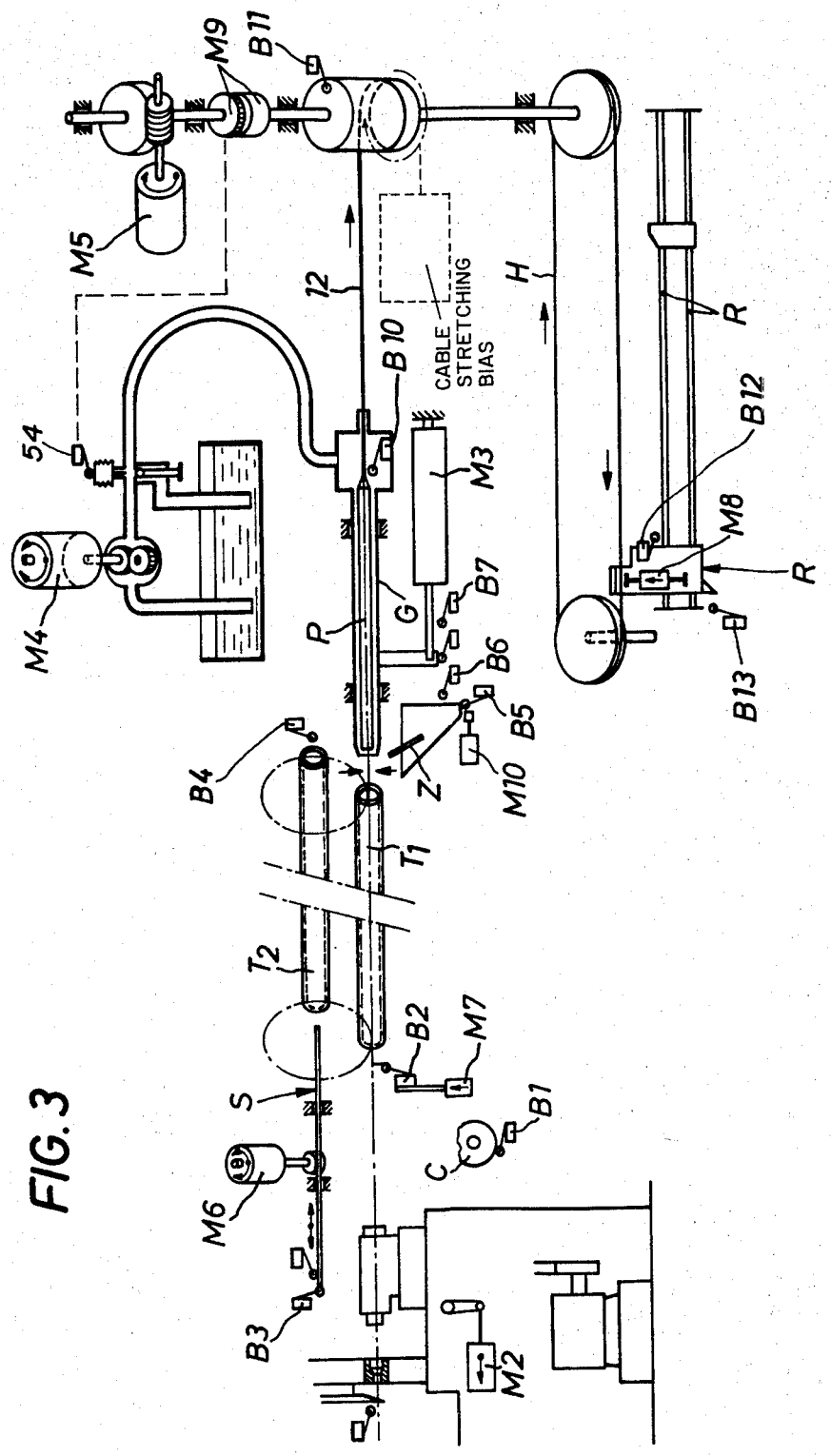
FIG. 3 is a diagram illustrating one feeding cycle.

For a better comprehension, the functions triggering the steps of a full feeding cycle will now be described, in short, with reference to the schematic representation of FIG. 3. Such a cycle comprises the operations acting on a bar which is in its working position, i.e. aligned with the axis of the chuck, but also the prepositioning of a second bar located in another tube of the magazine drum, which tube will eventually be aligned with this axis by the indexing operation preceding the next cycle.

A feeding cycle essentially comprises the following steps:

(a) When the preceding bar has been machined down to a predetermined length controlled by the position of a switch B11, the machining operations will be interrupted by a switch B1 which is itself controlled by the cam spindle C of the lathe;

(b) the motor M2 stops the cam spindle of the lathe; the motor M6 moves forward and acts on a push-rod S which prepositions a second bar lodged in another tube T2; a pump driven by the motor M4 sucks oil; the clutch M9 is activated and the motor M5 pulls on the cable 12; the motor M8 couples the metering slide R with the sprocket chain H, and an uncoupling of this connection is induced by a switch B13 when the metering slide R reaches the end of its path.

(c) the second bar (located in the tube T2) of the magazine drum reaches its preliminary position and acts on the switch B4 which puts the motor M6 into reverse, thereby removing the push-rod S from the tube T2; at the end of the removal the switch B3 stops motor M6;

(d) the plunger P reaches its rearmost position and activates the switch B10 which stops the sucking of oil, de-clutches M9 and interrupts the pull exerted by motor M5 on the cable; M10 and B5 can monitor the proper ejection of a stub;

(e) the housing G of the plunger, urged by the jack M3, reaches its rearmost position and acts on switch B7 which reverses the movement of jack M3 if the device pair M10-B5 has registered the passage of a stub Z; otherwise the apparatus is brought to a standstill;

(f) the housing G reaches its most forward position and acts on switch B6, which stops the jack M3; at this moment the front mouth of the housing G is hermetically connected with the tube T1 and the pumping motor M4 starts; the oil pressure frees the body of the plunger from the clamp 33 (c.f. FIG. 2), and pushes the plunger forward; the motor M7 positions the feeler B2 so that it can monitor the proper placing of the front end of the bar to be machined, with respect to the tools of the lathe;

(g) the bar arrives in its predetermined position and its front surface acts on the switch B2, thereby commanding the retraction—by the action of motor M7—of the associated feeler and also the coupling together of the slide R with the sprocket chain H; as the plunger, urged by oil pressure, continues to advance, the cable 12 unwinds from the drum and moves both the sprocket chain H which pulls the metering slide R until it meets its rearward stopping dog which acts on the switch B12 which itself de-clutches M8 in order to allow a further advance of the plunger; provided the full path of the slide from one limiting dog to the other corresponds exactly to the distance from the feeler of B2 to the intended relative position of the frontal surface of a new, unmachined bar with respect to the tools of the lathe before the first machining operation begins, B12 will report when a new bar is in its initial machining position; when the slide R has reached its rearmost position, B12 initializes the machining of a new workpiece, and the machining operations are resumed at the beginning of the next machining cycle of the lathe.

While there are shown and described present preferred embodiments of the invention, it is to be distinctly understood that the invention is not limited thereto, but may be otherwise variously embodied and practiced within the scope of the following claims. Accordingly,

What is claimed is:

1. Bar stock feed apparatus for an automatic lathe having a headstock with a chuck, said feed apparatus comprising:

at least one tube having a front end and a rear end and arranged to be disposed in use in alignment with said headstock for guiding a piece of bar stock engaged in said headstock with the front end of said tube near said headstock and the rear end of said tube remote from said headstock;

a housing having a front part and a rear part, the front part of the housing being tubular and being disposed in alignment with said tube and having a first end near the rear end of said tube;

a plunger disposed as a piston in said housing and having a front end and a rear end and adapted to be advanced from the housing so that the front end of the plunger enters said tube and pushes said piece of bar stock toward said headstock, and then to be retracted from said tube, so as to extract a remaining stub of said bar out from the headstock and to pull it backwards within the tube for removing it from said tube through the rear end thereof;

a hydraulic system connectable to the rear part of the housing for delivering fluid under pressure into the housing in order to exert on the plunger a hydraulic force to bring about advancing movement of the plunger;

a non extensible flexible member having first and second ends and having its first end attached to the rear end of the plunger;

a first pulling device connected to said second end of said flexible member for acting thereupon with a first pulling force for maintaining said flexible member stretched during advancing movement of said plunger;

a second pulling device connectable to said second end of said flexible member for acting thereon with a second, larger, pulling force for bringing about retracting movement of said plunger; and means for operatively connecting the second pulling device to the second end of said flexible member when the plunger is to be retracted.

2. Apparatus according to claim 1, comprising a metering device to which said non-extensible flexible member is connected for monitoring the lengthwise position of the plunger.

3. Apparatus according to claim 2, wherein said metering device comprises a second flexible member connected to the first-mentioned flexible member for lengthwise movement therewith, a metering slide, and a clutch for mechanically connecting the slide with the second flexible member.

4. Apparatus according to claim 3, wherein said second flexible member is a sprocket chain driven synchronously with said first flexible member and arranged to move parallel to the path of the metering slide for at least part of its trajectory, so that it can be gripped by the clutch and thus move the metering slide.

5. Apparatus according to claim 1, wherein the plunger is provided with an elastic, pretensioned collet for holding the piece of stock bar by the rear end thereof.

6. Apparatus according to claim 1, wherein the flexible member is a cable.

7. Apparatus according to claim 1, wherein the first pulling device comprises a revolving drum on which the flexible member is wound up, and bias means for giving the drum a first torque which exerts said first pulling force on the flexible member, the second pulling device comprises a motor, and the means for operatively connecting the second pulling device to the second end of said flexible member comprises a clutch for connecting the motor to the drum, whereby the motor gives the drum a second torque which exerts said second pulling force on the flexible member.

8. Apparatus according to claim 7, comprising a metering device to which said flexible member is connected for monitoring the lengthwise position of the plunger, said drum also being connected to the metering device.

9. Apparatus according to claim 1, wherein said housing is movable parallel to the tube by means of a jack, and comprises a locking mechanism for immobilizing the plunger within the housing.

10. Apparatus according to claim 9, wherein the locking mechanism can be unlatched by pressurizing the hydraulical system.

11. Apparatus according to claim 1, comprising within the hydraulic system a pressure-sensitive gauge which, during retracting movement of the plunger allows only said first pulling force to be exerted as long as the hydraulic pressure within the system exceeds a given value.

12. Apparatus according to claim 1, comprising a monitoring means for detecting the arrival of the front surface of said piece of stock bar in a longitudinally predetermined position.

13. Apparatus according to claim 1, wherein said pulling device always exerts a force at least as great as the first pulling force.

14. Apparatus according to any one of claims 1 to 13, wherein clearance is provided between the plunger and the interior of the housing to allow hydraulic fluid to flow towards the front end of the plunger.

* * * * *